United States Patent [19]

Murayama

[11] Patent Number: 4,837,835
[45] Date of Patent: Jun. 6, 1989

[54] SPEAKER SYSTEM FOR MOTOR VEHICLES WITH AN ALARM DEVICE

[75] Inventor: Fumio Murayama, Tendo, Japan

[73] Assignee: Pioneer Electronic Corporation, Tokyo, Japan

[21] Appl. No.: 175,788

[22] Filed: Mar. 31, 1988

[30] Foreign Application Priority Data

Apr. 1, 1987 [JP] Japan .............................. 62-049196[U]

[51] Int. Cl.⁴ .......................... H04B 1/00; G08B 13/14
[52] U.S. Cl. ...................................... 381/86; 340/426; 340/568
[58] Field of Search ...................... 381/86; 340/568, 63

[56] References Cited

U.S. PATENT DOCUMENTS

| | | | |
|---|---|---|---|
| 4,137,521 | 1/1979 | Martinez | 340/568 |
| 4,253,084 | 2/1981 | Topputo | 340/568 |
| 4,531,116 | 7/1985 | Takagi et al. | 340/568 |
| 4,620,182 | 10/1986 | Keifer | 340/568 |
| 4,679,026 | 7/1987 | Knakowski et al. | 340/568 |
| 4,706,070 | 11/1987 | Forti et al. | 340/568 |

Primary Examiner—Jin F. Ng
Assistant Examiner—David H. Kim
Attorney, Agent, or Firm—Fleit, Jacobson, Cohn, Price, Holman & Stern

[57] ABSTRACT

A speaker system for a motor vehicle includes a detection device which detects a change in the state of fixing of the speaker system on a part of the vehicle body by means of a fixing device. When the change in the fixing state is detected, an alarm is generated by an alarm device connected to the detection device, so that loosening of the fixing device such as a holding screw is surely prevented.

3 Claims, 2 Drawing Sheets

SPEAKER SYSTEM FOR MOTOR VEHICLES WITH AN ALARM DEVICE

BACKGROUND OF THE INVENTION

1. Field of the Invention

The present invention relates to a speaker system for motor vehicles, and more particularly to a speaker system equipped with an alarm device.

2. Description of Background Information

Various types of speaker systems are used in car-stereo systems. Flush-type speaker systems and on-the-shelf speaker systems are examples of such speaker systems. The flush type speaker systems are mounted in doors, or in the rear-window shelf of an automobile in such a manner that an opening having the size and shape for receiving a speaker (speaker unit or driver) of the speaker system is formed in an inside board of the door or in the rear-window shelf, and the speaker is fitted therein. In order to fix the speaker to the door or the rear-window shelf, screws provided at the peripheral part of a frame of the speaker, for example, are used. On the other hand, the on-the-shelf type speaker system has an enclosure (or a cabinet) in which one or more speaker is mechanically supported. In order to fix this on-the-shelf type speaker system on the rear-window shelf, screws provided at the bottom of the enclosure are generally used, in such a manner that the rear-window shelf is sandwiched between the bottom of the enclosure and an iron plate situated underneath the rear-window shelf, forming a part of the car body.

The above described method are generally employed for mounting speaker systems in a motor vehicle. However, since removal is as easy as the mounting in the case of the above method, stealing of speaker systems becomes frequently committed.

Moreover, since the vibration is inevitably generated while the motor vehicle is running, there also is a problem of loosening of the screws used for mounting the speakers or the speaker systems. In the event that the screws are loosened, the quality of sound generated by the speaker will be degraded. Furthermore rattling noises may be generated by the friction between the speaker system and the supporting part such as the rear-window shelf.

OBJECTS AND SUMMARY OF THE INVENTION

An object of the present invention is therefore to provide a speaker system for motor vehicles with an alarm device by which an alarm is generated upon detection of a change in the state of fixing of the speaker, thereby providing an antitheft function, and enabling to prevent the loosening of the holding screws.

According to the present invention,

DETAILED DESCRIPTION OF A PREFERRED EMBODIMENT

Figure 1:
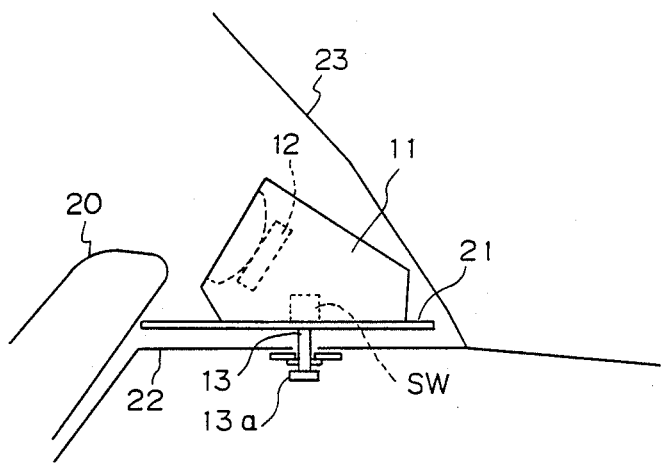
FIG. 1 is a schematic diagram showing the manner of arrangement of a speaker system according to the present invention on the rear-window shelf of an automobile.

Referring first to FIG. 1, the embodiment of speaker according to the present invention will be described in detail hereinafter.

In FIG. 1 which schematically shows the general arrangement, a speaker system having an enclosure 11 and a speaker 12 housed therein is mounted on a rear-window shelf 21, provided between a seat back 20 and a rear window 23 of an automobile. Underneath the rear-window shelf, there lies an iron plate 22 which is a part of the body of the automobile. The enclosure 11 of the speaker system is fixed on the rear-window shelf 21 by means of a holding screw 13 screwed into the bottom of the enclosure 11. In the enclosure 11, a detection switch SW is arranged to detect the tightness of the holding screw 13 in a manner which will be described later. The holding screw 13 is screwed into the bottom of the enclosure through a hole formed in the iron plate 22 and a hole formed in the rear-window shelf 21. Therefore the rear-window shelf 21 and the iron plate 22 are cramped between the enclosure 11 of the speaker system and a head 13a of the holding screw 13.

On the upper end of the holding screw 13 situated in the enclosure 11, there is provided switch contacts of the detection switch SW which opens when the holding screw 13 is loosened.

Figure 3:
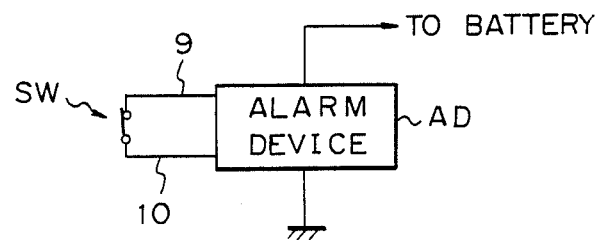
FIG. 3 is a block diagram showing the electrical connection of an alarm device of the speaker system according to the present invention.

As shown in FIG. 3 showing the circuit connection, the switch SW is connected to an alarm device AD through lead wires 9 and 10. A power current is supplied to the alarm device AD from the storage battery (not shown) of the automobile.

Preferably, the alarm device AD comprises a control circuit to which the detection switch SW is connected, and an alarm generation part. The control circuit is designed to activate the alarm generation part when the detection switch SW connected thereto is opened by the loosening of the holding screw 13, and generating an alarm signal in the form of audible sound or light, or both of them. Any of the known devices such as a buzzer, a signal lamp, and the klaxon (horn) of the automobile can be used as the alarm generation part of the alarm device AD. The Control circuit, for example, consists of a transistor through which the drive current of the alarm generation part is supplied, and the supply of a bias current thereof is controlled in response to the state of the detection switch SW.

Figure 2:
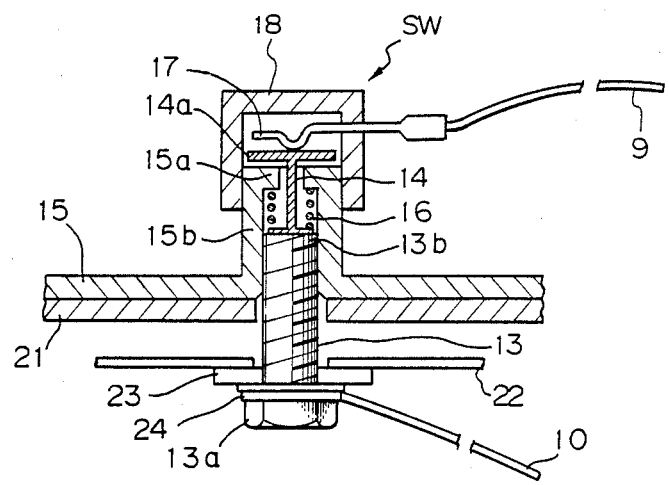
FIG. 2 is a partly sectional view of the structure for mounting the speaker system according to the present invention.

Referring to FIG. 2, the structure forming the connection of the holding screw 13 and the enclosure 11 and also the switch contacts of the detection switch SW will be described hereinafter.

As shown, a cylindrical portion 15b projecting upward is formed as a part of a bottom plate 15 of the enclosure 11. The inside of the cylindrical portion 15b threaded so that the holding screw 13 is screwed into the inside of the cylindrical portion 15b. An upper end 15a of the cylindrical portion 15b is given a shape forming a flat bearing surface which is contactable with a head part 14a of a contact element 14 which in turn is contactable, at its lower end, with the top end of the holding screw 13. The contact element 14 has a generally I-shaped cross-section and arranged to pass through a hole formed in the upper end 15a, at its middle part. Between the inner face of the upper end 15a of the cylindrical portion 15b and the lower end of the contact element 14, there is provided a compression spring 16 which exerts a biasing force between the lower end of the contact element 14 and upper end 15a of the cylindrical portion 15b. By the action of this compression spring 16, the contact element 14 is moved downward until the head part 14a thereof comes to abut to the upper end 15a of the cylindrical portion 15b.

On the other hand, as the holding screw 13 is screwed into the cylindrical portion 15b of the bottom plate 15, the upper end 13b of the holding screw 13 comes to contact to the lower end of the contact element 14. As the holding screw 13 is further driven, the contact element is pushed to move upward up to an upper limit position against the biasing force of the compression spring 16. In this state, the rear-window shelf 21 and the iron plate 22 are clamped between the head 13a of the holding screw 13 and the bottom plate 15.

In this way, the speaker system is tightly fixed on the rear-window shelf 21. Furthermore, if the distance between the bottom plate 15 and the iron plate 22 should be adjusted independently of the position of the holding screw 13, it is preferable to put a nut on the holding screw 13 near the head 13a, so that the rear-window shelf 21 and the iron plate 22 are clamped between the bottom plate 15 and the nut on the holding screw 13.

On the cylindrical portion 15b, there is placed a cap 18 which is made of an insulating material and holds a switch contact 17 in a space therein. The position of the switch contact 17 is determined so that it comes to contact with the upper end 14a of the contact element 14 when the latter is moved to its upper limit position by the holding screw 13, and it is apart from the upper end of the contact element 14 when the latter is moved to its lower limit by the biasing force of the compression spring 16.

Furthermore, on the holding screw 13, at a position between the head 13a and the iron plate 22, there is placed a terminal 24 to which the lead wire 10 is electrically connected. In order to provide insulation between the holding screw 13 and the iron plate 22, it is preferable to place an insulation ring 23 between the iron plate 22 and the terminal 24 put on the holding screw 13. On the other hand, the lead wire 9 is electrically connected to the switch contact 17 held in the cap 18. In the above described construction, the contact element 14 and the holding screw 13 are made of a conducting material, operating as switch elements of the detection switch SW together with the switch contact 17.

Therefore, when the holding screw 13 is screwed up tightly into the cylindrical portion 15b, to push the contact element 14 against th switch contact 17, an electric current flows through the switch contact 17, the contact element 14, and the holding screw 13. Thus, a closed circuit is made between the lead wires 9 and 10 (the detection switch SW is closed) when the speaker system is securely fixed on the rear-window shelf 21.

On the other hand, when the holding screw 13 is unscrewed, it is withdrawn from the cylindrical portion 15b, so that the contact element 14 is moved down to its lower limit position by the resilient force of the compression spring 16. Under this condition, the switch contact 17 and the contact element 14 are separated apart, so that the electric circuit is opened at this point. Therefore, the electric current no more flows between the lead wires 9 and 10 (the detection switch SW is opened) under this condition. As a result, as mentioned before, the alarm generation part of the alarm device AD is activated to generate the alarming signal.

In this way, the alarm is generated when the holding screw 13 is loosened, or it is removed to take away the speaker system. Therefore, if the holding screw is loosened by the vibration of the body of the motor vehicle, the driver can recognize the loosening of the holding screw by means of the alarm, and able to screw up the holding screw appropriately. Moreover, with the above described arrangement, the alarm is generated also when the lead wire 9 or 10 is cut or disconnected. Therefore, it is advantageous that the alarm is surely generated even if the lead wire is cut by somebody with the intention of stealing the speaker.

While the invention has been described by way of an embodiment wherein a speaker system is mounted in the vehicle body. However, it is to be understood that a speaker system without an enclosure can be mounted in the vehicle body in a manner similar to the above embodiment. In such a case, the elements forming the detection switch SW can be placed on a frame of the speaker or a baffle board supporting the speaker instead of the bottom plate of the enclosure used in the above described embodiment.

As specifically described above, a loosening detection operation is provided in the arrangement for fixing the speaker or speaker system in the vehicle body, according to the present invention. Thus, loosening of the fixing arrangement is surely monitored so that the quality of sound reproduced by the speaker is always maintained. Moreover, by the generation of the alarm, the speaker is sufficiently protected from stealing.

What is claimed is:

1. A speaker system for fixing a speaker to the vehicle body of a motor vehicle comprising:

a speaker unit;

a cabinet holding said speaker unit;

a fixing means for fixing said cabinet on a part of said vehicle body of said motor vehicle;

a detection switch having a contact element in connection with said fixing means, and a switch contact, said contact element being separated from said switch contact when said switch contact is shifted by a change in a state of fixing by said fixing means; and an alarming means electrically connected to said detecting switch, for generating an alarm when said contact element and said switch contact are separated.

2. A speaker system as set forth in clai 1, wherein said fixing means comprise a holding screw provided betweens aid cabinet and said part of said vehicle body, and wherein said switch contact is associated with said holding screw, whose opening and closing are controlled by a position of said holding screw.

3. A speaker system as set forth in claim 2, wherein said holding screw is operative as a part of an electric signal path of said detection switch.

* * * * *